PARTICULATE CARBONATES AND THEIR PREPARATION AND USE IN BREATHABLE FILM

(12) United States Patent
Calhoun et al.

(10) Patent No.: US 7,060,746 B2
(45) Date of Patent: Jun. 13, 2006

US007060746B2

(54) PARTICULATE CARBONATES AND THEIR PREPARATION AND USE IN BREATHABLE FILM

(75) Inventors: Allison Anne Calhoun, Sandersville, GA (US); Dickey S. Shurling, Sandersville, GA (US); Gary R. Mobley, Tennille, GA (US); Charity W. Miller, Charlotte, NC (US); Anthony D. McConnell, Childersberg, AL (US)

(73) Assignee: Imerys Pigments, INc., Roswell, GA (US)

( * ) Notice: Subject to any disclaimer, the term of this patent is extended or adjusted under 35 U.S.C. 154(b) by 309 days.

(21) Appl. No.: 10/722,135

(22) Filed: Nov. 26, 2003

(65) Prior Publication Data
US 2004/0147636 A1  Jul. 29, 2004

Related U.S. Application Data

(63) Continuation of application No. 09/847,405, filed on May 3, 2001, now Pat. No. 6,682,775.

(60) Provisional application No. 60/202,142, filed on May 5, 2000, provisional application No. 60/202,226, filed on May 5, 2000.

(51) Int. Cl.
*C08K 3/26* (2006.01)
(52) U.S. Cl. ............... 524/425; 524/300; 524/322; 427/215
(58) Field of Classification Search ............... 427/215, 427/220; 524/300, 322, 425
See application file for complete search history.

(56) References Cited

U.S. PATENT DOCUMENTS

| 3,803,065 A | * | 4/1974 | Arai et al. ............... 523/205 |
| 3,903,234 A | | 9/1975 | Ikeda et al. ............... 264/284 |
| 4,263,196 A | * | 4/1981 | Schumacher et al. ....... 524/423 |
| 4,350,655 A | * | 9/1982 | Hoge ..................... 264/145 |
| 4,690,809 A | | 9/1987 | Nathan et al. ............. 423/306 |
| 4,698,372 A | | 10/1987 | Moss ..................... 521/145 |
| 4,717,487 A | | 1/1988 | Griffith et al. ............ 252/1 |
| 5,008,296 A | | 4/1991 | Antoon, Jr. et al. ......... 821/91 |
| 5,011,698 A | | 4/1991 | Antoon, Jr. et al. ........ 426/395 |
| 5,300,138 A | | 4/1994 | Fischer et al. ............. 96/125 |
| 5,376,445 A | | 12/1994 | Fortuin et al. ............. 428/339 |
| 5,401,706 A | | 3/1995 | Fischer .................... 502/401 |
| 5,496,397 A | | 3/1996 | Fischer et al. ............. 96/154 |
| 5,695,868 A | | 12/1997 | McCormack ............... 442/389 |
| 5,733,628 A | | 3/1998 | Pelkie .................... 428/138 |
| 5,741,564 A | | 4/1998 | Gillberg-LaForce ........ 428/35.2 |
| 5,839,608 A | | 11/1998 | Gillberg-LaForce ........... 222/1 |
| 5,855,999 A | | 1/1999 | McCormack ............... 604/370 |
| 5,885,704 A | * | 3/1999 | Peiffer et al. ............. 428/315.9 |
| 5,900,310 A | * | 5/1999 | Murschall et al. .......... 428/214 |
| 5,910,136 A | | 6/1999 | Hetzler et al. ............. 604/367 |
| 6,015,764 A | | 1/2000 | McCormack ............... 442/370 |
| 6,037,281 A | | 3/2000 | Mathis et al. .............. 442/394 |
| 6,071,450 A | | 6/2000 | Topolkaraev et al. ... 264/193.12 |
| 6,075,178 A | | 6/2000 | La Wilhelm et al. ........ 604/361 |
| 6,096,014 A | | 8/2000 | Haffner et al. ............. 604/367 |
| 6,096,668 A | | 8/2000 | Abuto et al. ............... 442/328 |
| 6,106,956 A | * | 8/2000 | Heyn et al. ................ 428/516 |
| 6,111,163 A | | 8/2000 | McCormack et al. ....... 604/367 |
| 6,117,438 A | | 9/2000 | Topolkaraev et al. ....... 424/404 |
| 6,140,551 A | | 10/2000 | Niemeyer et al. .......... 604/367 |
| 6,156,421 A | | 12/2000 | Stopper et al. ............. 310/241 |
| 6,179,939 B1 | | 1/2001 | Jones, Jr. et al. .......... 156/73.1 |
| 6,258,308 B1 | | 7/2001 | Brady et al. ............... 264/210.2 |
| 6,261,674 B1 | | 7/2001 | Branham et al. ........... 428/218 |
| 6,264,864 B1 | | 7/2001 | Mackay ................... 264/154 |
| 6,277,479 B1 | | 8/2001 | Campbell et al. ........... 428/213 |
| 6,359,050 B1 | | 3/2002 | Dohrer et al. .............. 524/425 |
| 6,682,775 B1 | * | 1/2004 | Calhoun et al. ............ 427/215 |

FOREIGN PATENT DOCUMENTS

| EP | 0296 610 | | 12/1988 |
| EP | 0347 329 | | 12/1989 |
| EP | 1375579 A1 | * | 1/2004 |
| JP | 11 092141 | | 4/1999 |
| WO | WO 99/28050 | | 6/1998 |
| WO | WO 99/61521 | * | 12/1999 |

OTHER PUBLICATIONS

Satoshi Nago, et al., "Structure of Microporous Polypropylene Sheets Containing $CaCO_3$ Filler," *Journal of Applied Polymer Science*, vol. 45, pp. 1527-1535 (1992).
International Search Report for PCT/US01/14342 dated Dec. 20, 2001.

* cited by examiner

*Primary Examiner*—David W. Wu
*Assistant Examiner*—Henry S. Hu
(74) *Attorney, Agent, or Firm*—Finnegan, Henderson, Farabow, Garrett & Dunner, L.L.P.

(57) ABSTRACT

The present invention is a method of producing a breathable film including producing an inorganic filler by treating particles of an inorganic particulate material comprising an alkaline earth metal carbonate compound by reaction with a hydrophobizing surface treatment agent comprising one or more aliphatic carboxylic acids having at least 10 chain carbon atoms to produce a hydrophobic coating on the particles including a classification step to result in an inorganic filler having a reduced level of interfering particles. The invention is also breathable polymeric films made using the novel filler.

42 Claims, No Drawings

PARTICULATE CARBONATES AND THEIR PREPARATION AND USE IN BREATHABLE FILM

This application is a continuation of Ser. No. 09/847,405 filed May 3, 2001 now U.S. Pat. No. 6,682,775 which claims benefit of U.S. provisional application No. 60/202,142 filed May 5, 2000 and claims benefit to U.S. provisional application No. 60/202,226 filed May 5, 2000.

DESCRIPTION OF THE INVENTION

1. Field of the Invention

The present invention relates to a particulate alkaline earth metal carbonate, e.g., calcium carbonate, for use with a polymer composition for producing a polymer based end product, i.e., a thermoplastic film product, which may have a high mineral film loading. In particular, the present invention relates to a coated carbonate, with an unusually low level of interfering particles, and the processing and use of this carbonate.

2. Background of the Invention

Alkaline earth metal carbonates, particularly calcium carbonates are used as a particulate filler in end products comprising compositions incorporating thermoplastic polymers, such as film products. Such films, porous or non-porous, are manufactured for a number of consumer products such as garbage bags, backing materials, masking films, labeling, plastic paper, house wrap, roofing membranes, grocery sacks, diapers, bandages, training pants, sanitary napkins, surgical drapes, and surgical gowns. The compositions from which these films are made may include two basic components, the first being a thermoplastic polymer, usually a predominantly linear polyolefin polymer such as a linear low density polyethylene and the second being an inorganic particulate filler such as calcium carbonate. A third component, namely a bonding or tackifying agent may often be present. These components are mixed and compounded together to form a compound or concentrate which is formed (usually in a subsequent process) into a film layer using any one of a variety of film-producing processes known to those of ordinary skill in the film making art including casting or blowing. Alternatively, the film may be laid down on a substrate such as paper or board in a process known as extrusion coating.

After the film is fabricated into its desired form, and if the film is to be a porous breathable film, the film can then be stretched, uniaxially or biaxially, by any of the well-known techniques in the art including by hydraulics, by pinch rolls moving at different rates, by interdigiting rolls or by tentering.

Particulate filler loading levels determine to a great extent how far the precursor film must be stretched to attain a given degree of overall porosity. Below a lower end of the loading range, the pores are less numerous and less interconnected, and therefore, the film is less permeable at a given draw ratio than when a higher particulate filler loading is employed. Above a higher end of the loading range, either the materials will not blend uniformly or the sheet made from the composition will not stretch. The preferred loading in some applications, such as that in manufacturing the microporous film of U.S. Pat. Nos. 5,008,296 and 5,011,698, is very high, e.g., 60% to 75% by weight of the composition, with the filler preferably being a calcium carbonate.

U.S. Pat. No. 4,698,372 discloses a microporous polymeric film having good water vapor transmission rates and hydrostatic resistance to water penetration thereof. The film has a filler loading of 25–35 volume % of inorganic fillers such as calcium carbonate, among others, and uses a coating such as stearic acid, in order to reduce the effective surface tension of the filler to the approximate level of that of the matrix polymer.

U.S. Pat. No. 3,903,234 discloses gas permeable biaxially oriented film prepared from compositions of polyolefins containing 26% to 50% by weight of inorganic filler particles.

U.S. Pat. No. 4,176,148 discloses microporous oriented films composed of polybutene containing 3% to 80% by weight of inorganic fillers.

U.S. Pat. Nos. 5,376,445, 5,695,868, and 5,733,628 disclose breathable film or film laminates or composites which may or may not consist of fillers.

A smooth surface which is free from voids is necessary to enable the film to be stretched uniformly, a process which is generally employed in the production of breathable and other films. The present invention provides among other characteristics, reduced surface roughness.

The aforesaid U.S. Pat. Nos. 5,008,296 and 5,011,698 teach a method of maintaining the moisture level of a melt blended composition below 700 parts per million (ppm) and preferably below 300 ppm by cooling the extruded strands and/or pellets composed of polymer plus filler, which are used in the film composition using flowing air or employing vacuum-drying. However, this additional processing step is time consuming and costly.

Conventionally in the film making art, usage levels of a mineral filler, such as a ground calcium carbonate, in a host material have been less than about 20% by weight loading. Conventional fillers suffer from agglomeration problems associated with insufficient coating and/or the presence of moisture within the filler resulting in greater failure rates during the production of breathable films.

The present invention provides a product having reduced amounts of interfering particles and thereby results in a film product that is smoother and subjected to less failure. The product of the present invention having low levels of interfering particles also improves the rate at which film products can be produced.

SUMMARY OF THE INVENTION

Further advantages of the invention will be set forth in part in the description which follows. The advantages of the invention may be realized and attained by means of the instrumentalities and combinations particularly pointed out in the appended claims.

To achieve the foregoing advantages and in accordance with the purpose of the invention as embodied and broadly described herein, there is disclosed:

A method of consistently producing a coated particulate material having a reduced level of interfering particles and having particles of an alkaline earth metal carbonate with an median particle size between about 0.8 µm and 1.95 µm comprising:

(a) producing a coated particulate by treating particles of an inorganic particulate material of an alkaline earth metal carbonate compound with a median particle size between about 0.8 µm and about 1.95 µm by reaction with a hydrophobizing surface treatment agent comprising one or more aliphatic carboxylic acids having at least 10 chain carbon atoms to produce a hydrophobic coating on the particles;

(b) treating the coated particulate to result in a carbonate product having a level of interfering particles at or below 0.285% by weight.

There is further disclosed:

A method of producing a breathable film including:

(a) producing a coated particulate by treating particles of an inorganic particulate material comprising an alkaline earth metal carbonate compound by reaction with a hydrophobizing surface treatment agent of one or more aliphatic carboxylic acids having at least 10 chain carbon atoms to produce a hydrophobic coating on the particles;

(b) treating the coated particulate to result in a carbonate product having a level of interfering particles at or below 0.285% by weight;

(c) producing a filled thermoplastic composition by mixing the inorganic particulate having a reduced level of interfering particles produced in steps (a)–(c) with a heated thermoplastic polymer; and (d) shaping the composition produced in step (d) by heat processing to form a film product.

Finally, there is disclosed:

A film product produced according to the method above.

DESCRIPTION OF THE INVENTION

The purpose of the present invention is to provide a mineral particulate comprising an alkaline earth metal carbonate, especially calcium carbonate, which has properties allowing a film end product comprising a thermoplastic polymeric material together with the particulate to be easily and successfully produced with loadings of at least 10% by weight, preferably at least 20% by weight, and, surprisingly, in some cases at least 40% by weight and in some cases even up to 75% by weight. Particulate or filler, especially calcium carbonates, produced in a conventional manner would in many cases be unsuccessful in producing such film products without the application of special time consuming and costly additional processing steps during or after the formation of the composition (compound, masterbatch or blend) of particulate plus thermoplastic polymer to be employed to produce the film.

We have found that the production and use of a coated carbonate mineral particulate having a reduced level of interfering particles can surprisingly improve the quality of the carbonate particulate and the intermediate and final product in which it is used thereby enhancing the preparation of these products. Conventionally, carbonate fillers are screened prior to coating to remove large particles which are believed to interfere with the production of products such as breathable films. Large particles are those particles or agglomerates having a size greater than about 44 μm. Conventionally, the coated carbonate is again screened after coating to remove large agglomerates which are also believed to interfere with the production of film. Large agglomerates that are typically screened from the process after coating are over 200 μm.

Heretofore, it has not been known that interfering particles in the filler material at or below 200 μm materially and detrimentally affect both the process runnability and the characteristics of films produced with this material. "Interfering particles" as used in the present application refers to agglomerates that are at or below 200 μm, but greater than the median particle size of the desired carbonate product. More preferably, the interfering particles are those at or below 200 μm, but greater than the thickness of the desired end product, e.g., film. Agglomerate as used in the present invention is given its ordinary meaning of one or more particles that are clustered.

In preferred embodiments of the present invention, the interfering particles between 44 μm and 200 μm are the particles removed from the coated mineral particulate product, more preferably the interfering particles between 25 μm and 200 μm are the particles removed, and most preferably, interfering particles between 5 μm and 200 μm are the particles removed.

In another aspect of the present invention, the method of treating the carbonate to remove the interfering particles may have the added advantage of also removing discrete particles in the desired size range. Surprisingly, it has been found that materials having reduced interfering particles while still retaining the same number of smaller hard particles provide superior products for use in the production of breathable films. In a preferred embodiment, the mineral particulate material for use according to the present invention has a reduced level of interfering particles and a reduced level of small (under 44 μm) discrete particles.

According to the present invention in a first aspect there is provided an inorganic particulate material comprising an alkaline earth metal carbonate suitable for use as a mineral filler in the manufacture of thermoplastic film products which inorganic particulate material is coated with a hydrophobizing treatment agent comprising one or more aliphatic carboxylic acids having at least 10 chain carbon atoms and having a level of interfering particles of 44 μm or greater of 0.285% by weight or below, more preferably at or below 0.15% by weight most preferably at or below 0.08% by weight.

The mineral particulate having a reduced level of interfering particles according to the present invention will be referred to herein as the particulate product according to the present invention.

The particulate product according to the present invention may comprise a carbonate obtained from a mineral source and processed by refining and treatment processes including grinding to obtain a suitable particle size distribution. The grinding process may be carried out either in a dry state in the absence of added hygroscopic or hydrophilic chemicals or in a wet state in an aqueous medium in which any dispersant employed is minimized and/or subsequently removed from the filler in a known manner. Wet ground material is subsequently dried to an extent such that the particulate material has an appropriate moisture content. The particles of the particulate product according to the present invention are treated (coated) with one of the aliphatic carboxylic acid hydrophobizing surface treatment agents conventionally employed to coat carbonates.

The present invention is also directed to the preparation and use of the particulate product according to the present invention in intermediate and end products containing thermoplastic polymers such as film, especially breathable film, and compositions for forming such products requiring filler loading levels greater than about 10% by weight, and preferably more than about 20% by weight, and more preferably at least 40% by weight and even up to about 75% by weight.

In this specification 'film' means a sheet or layer of material having an median thickness of not more than about 250 μm. Typical thickness sizes and properties of films are described later. The film may be a breathable film, i.e., having microscopic interconnecting pores not greater than about 30 μm in size (usually much less). Such a film allows for example water vapor in the atmosphere on one side of the film to permeate to the atmosphere on the other side without liquid water being transmitted through the film.

The particulate product according to the present invention may comprise a white inorganic particulate pigment or filler selected from alkaline earth metal carbonates, e.g., calcium carbonate, magnesium carbonate, calcium magnesium carbonate or barium carbonate. Such a carbonate may be obtained from a natural source, e.g., marble, chalk, limestone or dolomite, or may be prepared synthetically, e.g., by reaction of carbon dioxide with an alkaline earth metal hydroxide, e.g., calcium hydroxide, or may be a combination of the two, i.e., naturally derived and synthetic material. Desirably, at least 95%, preferably at least 99%, by weight of the inorganic particulate material comprises alkaline earth metal carbonate although minor additions of other mineral additives, e.g., one or more of kaolin, calcined kaolin, wollastonite, bauxite, talc or mica, could also be present together with the carbonate. At least 95% to 99% by weight may be calcium carbonate which may be obtained in a well known way by processing naturally occurring calcium carbonate obtained from a mineral source or by chemical synthesis, e.g., from the reaction of carbon dioxide and lime (calcium hydroxide).

The particulate product according to the present invention preferably has one or more of the following particle size properties:

i. a mean particle size (approximately equal to the value $d_{50}$ defined below) of from about 0.5 μm to 10 μm, especially from about 0.5 μm to 5 μm, e.g., from about 0.8 μm to 3 μm;

ii. a particle size distribution steepness factor, i.e., $d_{50} \div d_{20}$, where $d_{50}$ is the particle size value less than about which there are 50% by weight of the particles, and $d_{20}$ is the particle size less than about which there are 20% by weight of the particles, of less than about 2.2, desirably 1.1 to 2.2;

iii. a top cut (the particle size value less than about which at least 99% by weight of the particles of the material have a size) of less than about 10 μm, desirably less than about 8 μm;

iv. a specific surface area of from 3 $m^2.g^{-1}$ to 6 $m^2.g^{-1}$ as measured by the BET nitrogen absorption method;

v. a moisture pick up of less than about 0.35% by weight, more preferably less than about 0.2% by weight, and most preferably less than about 0.1% by weight;

vi. a loss on ignition value of less than about 1.3%, more preferably less than about 1.1%, and most preferably on the order of about 1.0%.

All particle size values as specified herein are measured by the well known conventional method employed in the art of sedimentation of the particles in a fully dispersed state in an aqueous medium using a SEDIGRAPH 5100 machine as supplied by Micromeritics Corporation, USA.

The particulate product according to the present invention preferably has a total surface moisture content which is preferably less than about 0.1% by weight even after exposure for 40 hours at 20° C. to a moist atmosphere having a relative humidity of 80%. Desirably, the surface moisture content is less than about 0.1% by weight even after exposure for 40 hours at 20° C. to an atmosphere having a relative humidity of 97%. We have found that although compounding may be carried out in the presence of prior art fillers having a content of interfering particles, use of the particulate product according to the present invention allows easier processing to take place.

In an alternative embodiment, the present invention relates to the production of a mineral product having reduced levels of interfering particles in a preferred median particle size in the range of from about 0.8 μm to about 1.95 μm. In this embodiment of the present invention, using the method according to the present invention, one skilled in the art can consistently achieve a product having a low level of interfering particles. According to this embodiment of the invention, this carbonate is useful in the production of garbage bags, backing materials, masking films, labeling, plastic paper, house wrap, roofing membranes, grocery sacks, diapers, bandages, training pants, sanitary napkins, surgical drapes, and surgical gowns. This embodiment of the present invention is preferably preferred in the production of breathable films.

Film products, especially breathable film products can be successfully produced according to the present invention in a known manner with a low reject rate. In contrast, other fillers not having such a low content of interfering particles may make film products that have more holes, a greater failure rate and a rougher texture. Breathable film products will usually have to be rejected if they contain macroscopic voids or holes through which liquid water can pass. Such defects are usually caused by use of a conventional filler having a surface moisture content and a level of interfering particles which have not been suitably controlled.

Where the particulate product according to the present invention has been obtained from a natural mineral source it may have been processed, e.g., by known purification, comminution and particle size classification procedures to have a suitable form prior to use to form the particulate product according to the present invention. However, following such processing the amount of hygroscopic or hydrophilic additives present is preferably minimized, as described earlier, e.g., by removing any such additives used by a washing process.

The particulate product according to the present invention is treated with a hydrophobizing surface treatment agent and the treatment may be carried out prior to use by addition to thermoplastic polymeric material. Alternatively, the hydrophobizing agent, sometimes referred to as antagonizing agent, may be added directly to the thermoplastic polymer with which the particulate product according to the present invention is to be compounded, before, during or after addition of the particulate product according to the present invention. For maximizing the effect of the hydrophobizing agent, we prefer complete surface treatment of the particulate product according to the present invention prior to addition to the thermoplastic polymer.

Use of surface treatment agents, which, when added to the inorganic particulate material which is dry, facilitate dispersion of the inorganic particulate material in hydrophobic polymeric material are well known. Suitable surface treatment agents are known to include aliphatic carboxylic acids having from 10 to 30 carbon atoms in their chain, including but not limited to, stearic acid, behenic acid, palmitic acid, arachidic acid, montanic acid, capric acid, lauric acid, myristic acid, isostearic acid and cerotic acid and mixtures thereof.

The production route employed for producing the particulate product according to the present invention can be selected from the many procedures known to those skilled in the art and coupled with a classification and/or a milling process to produce a carbonate product, having an unusually low interfering particle content.

In one embodiment, the process involves comminution of the starting carbonate, e.g., calcium carbonate, by wet grinding. Any dispersant employed is preferably minimized or removed. Alternatively, grinding may be carried out by a known dry grinding process.

The wet processing of the carbonate, where employed, may be done either by autogenous grinding or by ball milling and/or by stirred media grinding. In autogenous grinding, the particles of the carbonate ore itself act as the grinding media. The feed to the autogenous grinders is the various quarry run ore. Stirred media grinding uses hard, e.g., ceramic or graded sand, media usually having particles larger than the particles to be ground. Usually stirred media grinding starts with a finer feed from a classification step.

Where a wet grinding process is employed to produce the particulate product according to the present invention, the amount of water soluble hydrophilic dispersant remaining following grinding is preferably not greater than about 0.05% by dry weight of carbonate. A less preferred embodiment according to the present invention might use an anionic water soluble dispersant, such as sodium polyacrylate, generally used in a conventional high solids wet grinding or dry grinding process, alone or in combination. Such materials may have an undesirable effect on the ability to dry carbonates and once dried, to maintain that dry state. Such a dispersant is hygroscopic, i.e., attracts moisture, and as it is water soluble makes elimination of surface water difficult. However, residual amounts of other, less hydrophilic dispersants may be present in greater amounts.

Desirably, the amount of residual dispersant or other hydrophilic chemical on the carbonate is not greater than about 0.05% by weight based on the dry weight of the carbonate.

The wet processed ground carbonate may be washed and dewatered in a known manner, e.g., by flocculation, filtration or forced evaporation, prior to drying. A polyelectrolyte might be added in small quantities where it is to be used to flocculate the mineral for ease of dewatering, but the amount of such polyelectrolyte preferably is not greater than about 0.05% by weight based on the dry weight of carbonate.

Following grinding, the carbonate from which the particulate product according to the present invention is to be produced may be dried by removing water to leave not more than about 0.10% (desirably less than about 0.10%) by weight surface moisture content associated with the material. This drying procedure may be carried out in a single step or in at least two steps, e.g., by applying a first heating step to the carbonate to enable the adhered moisture content to be reduced to a level which is not greater than about 0.20% by weight based on the dry weight of the carbonate; and applying at least a second heating step to the carbonate to reduce the surface moisture content thereof to 0.10% by weight or less.

The carbonate is to be surface coated with a hydrophobizing surface treatment agent and the second heating step may be applied before and/or during the surface treatment step. The second heating step may suitably be carried out by an indirect heating means as discussed later. The first heating step may be by a direct or indirect heating means.

Where the drying of the surface of the carbonate is carried out by more than about one heating step, the first heating step may be carried out by heating in a hot current of air. Preferably, the carbonate is dried by the first heating step to an extent that the adsorbed moisture content thereof is less than about 0.20% by weight, preferably less than about 0.10% by weight based on the weight of the carbonate.

The ground carbonate may be further dried in the second heating step prior to or during a surface treatment of the carbonate to the extent that the adsorbed moisture content thereof is preferably not greater than about 0.10% by weight, preferably not greater than about 0.085% or less by weight, based on the dry weight of the carbonate.

According to a preferred embodiment of the present invention, the carbonate particles preferably carry substantially no surface moisture, or at most 0.10% by weight, desirably at most 0.085% by weight, at the point the particles are contacted by a surface treatment agent, i.e., the hydrophobizing surface treatment agent comprising an aliphatic carboxylic acid, for surface coating thereof.

In a preferred process according to the present invention the product is preheated prior to being subjected to the surface treatment.

While the carbonate may be heated during the coating process, the residence time is very short and therefore, the time available to heat the carbonate during coating is very short. In addition the carbonate is stored prior to introduction to the coating apparatus, thus allowing the carbonate to cool down from the deviated temperature it achieved during the drying process. During this cooling period there is a possibility of moisture condensation on the carbonate. Not wishing to be bound by theory, it is believed that this moisture can inhibit the efficient coating of the carbonate. Therefore removing any moisture that condensed between the period the product was dried and the coating step by preheating prior to coating is a most preferred embodiment of the present invention.

The surface treatment of the carbonate is preferably carried out in a dry atmosphere containing a surface treatment agent as a liquid (e.g., as droplets) in a vessel heated indirectly, e.g., by a heating jacket, e.g., containing a heating fluid, e.g., heating oil.

As described in copending PCT/US98/25332 (herein the "PCT '332" the contents of which are incorporated herein by reference), the temperature of the atmosphere in the vessel is varied and controlled so that a selected atmosphere reaction temperature may be chosen and monitored. The vessel may comprise an elongated heated cylindrical structure. Desirably, the required temperature is maintained throughout the region where the surface treatment agent is applied and exits from that region at about 80° C., desirably about 120° C., or more, e.g., 150° C. or more. It is theorized by the present inventors that attaining the preferred low adsorbed moisture content of or preferably below 0.10% can be attained on the particulate carbonate surface using indirect heating in this way since the carbonate being indirectly heated is not exposed to any combustion byproducts from a heating furnace, such as water, which would be the instance if a direct heating system were used. A direct heating system generally involves the use of a vessel heated with flue gases which creates an atmosphere of gases including water vapors which can add to the moisture content of the surface of the carbonate in the vessel. Most conventional ground calcium carbonates are heated and surface treated through this direct heating system described hereinbefore. As described earlier, a direct heating system can be employed in the first step to remove most of the surface moisture, e.g., to a level of not greater than about 0.2% by weight, based on the dry weight of the carbonate, and, thereafter, in the second step use of an indirect heating system is preferably used to avoid the introduction of moisture by the heating step.

The average temperature at which the carbonate is treated with the surface treatment agent may desirably be a temperature in the range 80° C. to 300° C., especially 120° C. to 180° C. with a residence time of the carbonate in the vessel being greater than about 2 seconds. The residence time may range from about 50 to about 1000 seconds, e.g., 50 seconds to 500 seconds.

Preferably, the surface treatment agent comprises stearic acid or a mixture of fatty acids containing stearic acid, e.g., technical grade stearic acid which typically consists of about 65% by weight stearic acid and about 35% by weight palmitic acid. Other unsaturated fatty acids which may be used to produce carbonates in accordance with the invention may be selected from the group consisting of capric acid, lauric acid, montanic acid, myristic acid, isostearic acid and cerotic acid and mixtures of two or more of these acids and stearic acid and/or graded stearic acids.

The surface treatment agent preferably is a hydrophobizing agent which becomes chemisorbed onto the carbonate particles in order to facilitate dispersion of the carbonate in the polymeric thermoplastic material. For example, stearic acid reacts with calcium carbonate to form a chemisorbed coating of calcium stearate thereon. Such a coating gives superior properties to calcium stearate pre-formed as a compound and typically deposited on the carbonate. In that a main objective of the invention is to reduce the moisture content on the surface of the carbonate, thereby to reduce and maintain the moisture content in the system during the manufacturing process of compositions and products therefrom, it can be appreciated that the presence of a hydrophilic agent is highly undesirable and that only very minute traces (i.e., not greater than about 0.05% by weight) of a hydrophilic component are tolerable on the carbonate to be treated with the surface treatment agent. These reduced moisture contents assist in achieving mineral particulates with the lowest interfering particle levels.

Desirably, as described in PCT '332, the amount of surface treatment agent which is present in the heated atmosphere in which the carbonate is to be contacted by and treated with the agent is not substantially greater than about the maximum theoretical amount of the agent which can become bonded by chemisorption to the carbonate. This maximum theoretical amount is dependent on the surface area of the particles of the carbonate. The theoretical surface coverage S by the surface treatment agent is given by the equation:

$$S = M_a N A_a \tag{1}$$

where $M_a$ is the number of moles of the surface treatment agent present, $A_a$ is the surface area occupied by 1 molecule of the surface treatment agent, and N is Avagadro's number. Using Equation (1), it can be shown for example that 1 g of technical grade stearic acid (~65% by weight stearic acid and ~35% by weight palmitic acid) covers about 4.60 m² of the surface of a carbonate. Thus, for a particulate material having a surface area of about 4.60 m².g⁻¹, as measured by the BET nitrogen absorption method, about 0.01 g of surface treatment agent is required to give complete coverage of the surface area of each 1 g of carbonate.

Thus, the required theoretical maximum concentration of the surface treatment agent for a calcium carbonate particulate material having a surface area of 4.60m²/g is 1.0% based on the weight of the particulate material to be treated. In practice, the amount of surface treatment agent which becomes bonded to (i.e., chemisorbed onto) the particulate material is less than about the theoretical maximum, although by carrying out the surface treatment at a higher temperature than conventionally employed, as described hereinbefore, the amount can approach more closely the theoretical maximum and the amount of undesirable unreacted (physisorbed) surface treatment agent remaining can thereby be advantageously and unexpectedly minimized.

Desirably, as described in PCT '332, the concentration of surface treatment agent present in the atmosphere in which the particulate material is to be surface treated by the agent is not substantially greater than about X % by weight based on the weight of particulate material, where X is given by $$X = T + U \tag{2}$$

where T is the theoretical amount of the agent required to cover the surface area of the particulate material and U is the amount of unreacted surface treatment agent (% by weight based on the dry weight of the particulate material) obtained when the particulate material is in fact treated by the agent under the treatment conditions employed (this may be determined from a previous treatment run under the same conditions). Desirably, the concentration of the applied surface treatment agent is between about 0.8X and about 1.0X.

It has been shown and described in PCT '332 that a suitable amount of surface treatment agent is that required to coat or slightly undercoat or not substantially overcoat the carbonate. The amount required depends on the surface treatment agent employed, as explained earlier. For an agent containing at least 60% by weight stearic acid, for example, the amount is preferably in the range of from about 1.0% to about 1.4% based on the dry weight of the carbonate.

The particulate product according to the present invention is dried to a total surface moisture level not exceeding 0.10% by weight, and preferably less than about 0.085% by weight, based on the dry weight of the particulate product according to the present invention. Preferably, the surface moisture level is within these specified limits both immediately preceding and following surface coating. The surface moisture level may be measured in a known manner, e.g., by a Karl Fischer titration apparatus or by a microbalance.

Karl Fischer titrimetry is an accurate and well known moisture measurement method utilizing the quantitative reaction of water with iodine. This method is widely used as the conventional method of moisture measurement because of its high selectivity and sensitivity.

In coulometric Karl Fischer titration, the sample is added to a pyridine-methanol solution (with iodine and sulfur dioxide as principal components). The iodine, generated electrolytically at the anode, reacts with the water in the sample as shown in Formula (1).

$$I_2 + SO_2 + H_2O \rightarrow 2HI + [SO_2]SO_3 \tag{1}$$

Iodine is generated in direct proportion to the quantity of electric charge, according to Faradays' Law.

$$2I^- - 2e \rightarrow I_2$$

One mole of iodine reacts with and equates quantitatively to one mole of water. Therefore, 1 mg of water is equivalent to 10.71 Coulombs. Based on this principle, water content can be directly determined from the quantity of electric charge required for electrolysis.

According to the present invention, the coated particulate material is then treated to reduce the level of interfering particles that are present in the coated particulate material. Treatment of the coated particulate material may be by any art recognized or after developed method that results in a reduction of interfering particles. Preferred methods for treating the coated particulate material include classifying the coated particulate material and then either discarding the interfering particles or milling the interfering particles. In one preferred embodiment, the milled product may be returned to the classifier prior to further processing. Alternatively, treatment can be carried out by milling the product directly as it exits the coating process. In another preferred embodiment, the milled product is then subjected to a classification step and in some cases, additional milling of remaining interfering particles. Other methods for achieving the reduced levels of interfering particles will be readily apparent to the skilled artisan.

Apparatus for classification and for milling are both readily apparent to the skilled artisan and could be appropriately selected. Classification can be carried out by, for example, air classification, triboelectric separation or mechanical separation using, for example, a table separator or screen. External classifiers are available from Progressive Industries or RSG. Milling apparatus that would be appropriate for use in the present invention include micropulverizers, pebble mills, ultrafine media mills, cell mills, disk mills and pin mills. Preferred apparatus for this process includes know air classifier mills (ACMs). As alternatives to the ACM produced by Hosokawa Micron of Summit, New Jersey, there are other apparatus that function in a similar manner to classify and mill the mineral particulate in a single operation. These alternatives include a CMT or a Sturtevant Powderizer.

An alternative approach is the Cell Mill type where there are also designs from Altenberger, Bauermeister and Ultra Rotor. None of these machines is fitted with an integral classifier with a throwout, although the Bauer Mills are fitted with a rudimentary throwout device.

In one embodiment of the present invention, the preferred treatment method of the coated particulate material includes both a classification and milling step. This two-step process of classifying and milling may be carried out in a single apparatus. Preferably, the process of the present invention is preferably carried out in a single piece of machinery capable of performing all of the necessary steps. In this embodiment, the material after it exits the coating processes, is subjected to classification. The interfering particles are then subjected to milling. Milling is not carried out to grind the carbonate finer since that would take a considerable amount of energy, although such grinding is not precluded; milling is preferably used to breaking down the interfering particles, agglomerates or particles that have been bonded or stuck together. Once the interfering particles are broken down the milled material is returned to the classifier which again separates any remaining interfering particles and again sends the stream of interfering particles to be milled. This is one example of a continuous production loop, however, this process may be carried out in batches as appropriate.

In an alternative embodiment according to the present invention, the coated material may be classified to remove the interfering particles and also beneficially, certain discrete particles and this waste stream may then be discarded. This process while producing a further improved product has certain economic disadvantages over the preferred milling process due to the materials loss associated with discarding the waste stream.

Preferably, the particulate product according to the present invention is a ground calcium carbonate produced by either a dry grinding process or a wet grinding process described hereinabove.

The polymeric material to which the particulate product according to the present invention is added to form a high loading (i.e., greater than about 10%) composition may comprise, for example, a continuous thermoplastic polymer matrix.

The particulate product according to the present invention may be incorporated in an application composition (to form an intermediate or end product) together with a thermoplastic polymeric material and other optional conventional additives, e.g., a bonding or tackifying agent.

The process employed to form the product from the thermoplastic material and the particulate product according to the present invention may be one or more of the methods well known in the art as described later.

The particulate product according to the present invention has been found to work extremely well as a filler in producing intermediate product compositions and final film products therefrom when used together with thermoplastic polymers and other optional ingredients. Most preferred products are made from polyolefin based polymers and end products are produced therefrom such as cast film, blown film, and extrusion coatings. Using the particulate product according to the present invention in such applications results in superior dispersion and extrusion performance, particularly with respect to homogeneity of the film produced and beneficially and surprisingly freedom from voids even at high filler solids. The low associated free moisture content of the particulate product according to the present invention allows the particulate product according to the present invention to be incorporated into formulations (to be made into film products) at filler loadings ranging from 10% to as high as 75% and higher (by weight), while maintaining its ability to be processed into useful thin films, especially breathable films having other desirable properties as described later, using known processes, e.g., using cast or blown film, or extrusion coating processes.

According to the present invention, a method of producing a porous, breathable film includes use in the film forming process of a composition which includes a thermoplastic polymeric material together with a filler, wherein the filler comprises partly or wholly the particulate product according to the present invention defined earlier.

The thermoplastic polymer may form from 20% to 70% by weight and the filler will form from 30% to 80% by weight of the composition, i.e., combination of the polymer plus filler. More preferably, the thermoplastic polymer forms from about 35% to about 55% by weight of the composition and the filler forms from about 45% to about 65% by weight of the composition. The polymer preferably comprises more than about 50% by weight of olefin units and is referred to as polyolefin resin.

The resins which can be used to provide the polyolefin resin, for example, include mono-olefin polymers of ethylene, propylene, butene or the like, or copolymers thereof as a main component. Typical examples of the polyolefin resin include polyethylene resins such as a low-density polyethylene, linear low-density polyethylene (ethylene-α-olefin copolymer), middle-density polyethylene and high-density polyethylene; polypropylene resins such as polypropylene and ethylene-[poly]propylene copolymer; poly(4-methylpentene); polybutene; ethylene-vinyl acetate copolymer; and mixtures thereof. These polyolefin resins may be obtained by polymerization in a known way, e.g., by the use of a Ziegler catalyst, or obtained by the use of a single site catalyst such as a metallocene catalyst. Above all, polyethylene resins are preferable, and linear low-density polyethylene (ethylene-α-olefin copolymer) and low-density polyethylene are most preferable. Furthermore, in view of the moldability, the stretchability and the like of the film, the melt index of the polyolefin resin is preferably in the range of about 0.5 to 5 g/10 min.

Desirably, the filler includes at least 50% by weight, e.g., from 80% to 99% by weight of the particulate product according to the present invention, where one or more other fillers are employed together with the particulate product according to the present invention.

Examples of the other fillers include calcium carbonate (produced not in accordance with the invention), barium sulphate, calcium sulphate, barium carbonate, magnesium hydroxide, aluminum hydroxide, zinc oxide, calcium oxide, magnesium oxide, titanium oxide, silica and talc. The average particle diameter of the other filler is preferably 20 μm or less, preferably 10 μm or less, preferably in the range of 0.5 to 5 μm. In order to improve the dispersibility of the other filler in the polyolefin resin, the other filler may be subjected to a surface treatment to render its surfaces hydrophobic, may be used. Examples of suitable surface treatment agents include the fatty acids such as stearic acid, specified earlier.

The composition ratio between the thermoplastic polymeric material, e.g., polyolefin resin and the filler has an influence on the moldability and the stretchability of the film as well as the breathability and the moisture vapor transmission of the obtained film. If the amount of the filler is insufficient, adjacent micropores, which are required to be obtained by the interfacial separation of the polyolefin resin and the inorganic filler from each other, are not continuous, so that a porous film having the good gas breathability and moisture vapor transmission cannot be obtained. On the contrary, if the amount of the filler is excessive, defective molding occurs during the film forming process and the stretchability deteriorates, so that the sufficient stretching cannot be carried out. In view of these limiting factors, the composition ratio between the polyolefin resin and the inorganic filler may be from 25 to 70 parts by weight of the polyolefin resin with respect to from 75 to 30 parts by weight of the filler, e.g., from 30 to 60 parts by weight of the polyolefin resin with respect to 70 to 40 parts by weight of the filler.

In the manufacture of a breathable film by the method according to this aspect of the invention a concentrate or masterbatch of the thermoplastic polyolefin resin and the filler, including the particulate product according to the present invention, may first be produced by mixing and compounding prior to the film production stages.

The mixture of ingredients to be blended by compounding may include in addition to the resin and the filler other known optional ingredients employed in thermoplastic films, e.g., one or more of bonding agents, plasticisers, lubricants, anti-oxidants, ultraviolet absorbers, dyes, colorants. A bonding or tackifying agent, where employed, may facilitate bonding of the film after formation to another member, e.g., a non-woven fibrous layer, or one or more non-porous layers.

The polyolefin resin, the filler and if necessary, other optional additives, may be mixed by the use of a suitable compounder/mixer e.g., a Henschel mixer, a super mixer, a tumbler type mixer or the like, and kneaded and may be pelletized, e.g., by the use of a single screw extruder or a twin-screw extruder which forms strands which may be cut or broken into pellets.

The masterbatch or concentrate, e.g., in the form of pellets, is melted and molded or shaped into a film by the use of a known molding and film forming machine.

The film may be a blown film, cast film or extruded film. Other types of films are also considered to be within the scope of the present invention provided the forming technique is compatible with filled films. Appropriate methods for producing the films according to the present invention will be readily apparent to the skilled artisan. The film as initially formed may be too thick and may not yet have a sufficient degree of breathability as measured by its water vapor transmission rate. Consequently, the film may be heated, e.g., to a temperature of about 5° C. less than about the melting point of the thermoplastic polymer or more, and then stretched to at least about 1.2 times, preferably at least 2.5 times, its original length to thin the film and render it porous.

An additional feature of the thinning process is the change in opacity of the film. As formed, the film is relatively transparent but after stretching, it becomes opaque. In addition, while the film becomes orientated during the stretching process, it also becomes softer. Taking all these factors into consideration, and the desire to have a water vapor transmission rate of at least 100 grams per square meter per 24 hours, the film may, for example, be thinned to such an extent that it has a weight per unit area of less than about 35 grams per square meter for personal care absorbent article applications and a weight per unit area of less than about 18 grams per square meter for certain other applications.

The molding and film forming machine may for example comprise, as in the prior art, an extruder equipped with a T-die or the like or an inflation molding machine equipped with a circular die. The film production may be carried out at some time after the masterbatch production, possibly at a different manufacturing plant. In some cases, the masterbatch can directly be formed into the film without producing an intermediate product, e.g., by pelletizing.

The film can be stretched in at least a uniaxial direction at a temperature of from room temperature to the softening point of the resin in a known manner such as a roll method, an interdigitizing method, or a tenter method to bring about the interfacial separation of the polyolefin resin and the inorganic filler from each other, whereby a porous film can be prepared. The stretching may be carried out by one step or by several steps. Stretch magnification determines film breakage at high stretching as well as breathability and the moisture vapor transmission of the obtained film, and so excessively high stretch magnification and excessively low stretch magnification are desirably avoided. The stretch magnification is preferably in the range of 1.2 to 5 times, more preferably 1.2 to 4 times in at least a uniaxial direction. If biaxial stretching is carried out, it is possible that for example stretching in a first direction is applied in the machine direction or a direction perpendicular thereto, and stretching in a second direction is then applied at right angles to the first direction. Alternatively, the biaxial stretching may be carried out simultaneously in the machine direction and the direction perpendicular thereto. Any method known in the art or after developed can be applied in making the film in the method according to this aspect of the present invention.

After the stretching, a heat setting treatment may be carried out if required in order to stabilize the shape of obtained voids. The heat setting treatment may be, for example, a heat setting treatment at a temperature in the range of from the softening point of the resin to a temperature less than about the melting point of the resin for a period of 0.1 to 100 seconds.

No particular restriction is put on the thickness of the porous film produced by the method according to the present invention. The thickness should be such as to obtain film unlikely to tear or break and which has appropriate softness and good feel. Usually, the thickness of the porous film is in the range of 5 μm to 100 μm, preferably 10 μm to 70 μm.

For purposes of the present invention, a film is "breathable" if it has a water vapor transmission rate of at least 100 $g/m^2/24$ hours as calculated using the test method described in U.S. Pat. No. 5,695,868. Generally, once the film is formed, it will have a weight per unit area of less than about 100 grams per square meter and after stretching and thinning its weight per unit area will be less than about 35 grams per square meter and more desirably less than about 18 grams per square meter.

The porous film can be suitably utilized in applications requiring softness, for example, as the backing sheet of disposable diapers. "Porous" as used in the present application includes but is not coextensive with "breathable" films. No particular restriction is put on the lower limit of the softness, but it is usually about 20 mm.

The porous film prepared by the method according to the present invention having such properties may have a suitable breathability, moisture vapor transmission and feeling as well as excellent mechanical properties and long-term adhesives properties. Therefore, the porous film can be suitably used in products such as disposable diapers, body fluid absorbing pads and bed sheets; medical materials such as surgical gowns and base materials for hot compress; clothing materials such as jumpers, rainwear; building materials such as wallpapers and waterproof materials for roofs and house wraps; packaging materials for packaging desiccants, dehumidifying agents, deoxidizers, insecticides, disposable body warmers; packaging materials for keeping the freshness of various articles and foods; separators for the cells; and the like. The porous film is particularly desirable as a material used in products such as disposable diapers and body fluid absorbing pads. The porous film may in such products be formed into a composite or laminate in one of the ways well known in the art with one or more other layers, e.g., a non-woven fibrous layer, e.g., by an adhesive or bonding agent.

One problem associated with prior art products is bridging, i.e., the building over of mineral particulates when flowing from a bin, which leads to plugging and inconsistent flow rates. If the mineral particulate fails to flow in a consistent manner then the compounding process produces inconsistent compound due to the varying amounts of the carbonate to resin ratio. The material also demonstrates properties described as tacky or sticky based upon the presence of free acid, a byproduct from the coating process. Thus, the mineral particulate has been observed sticking to pipes and valves and also to itself resulting in interfering particles or agglomerates.

Additional problems associated with compounding are screen blinding and outgassing. Outgassing is when volatiles, in this case water flash off in the extruder and condense in the carbonate feed lines which further cause bridging and inconsistent flow into the extruder. Screening is when the compound is strained through a screen, in this case a 325 mesh, while in the melt form. Screen blinding is caused by improperly coated material, large discreet particles (over 44 μm) and agglomerates catching on the screen and begins to break down further blocking the screen.

Like the compounder, the film producer also experiences these types of problems when using inefficiently coated carbonate. Furthermore, the film producer can experience film lacing, holes and surface imperfections. Lacing is associated with moisture and once the film is stretched will lead to a complete failure. Holes are areas where the film has complete separation and once a hole is stretched it becomes a failure. A hole is formed when the moisture in the compound associated with the carbonate boils in the film thus, creating a pinhole. Imperfections will not always lead to a failure but will effect the general appearance of the film.

Embodiments of the present invention will now be described by way of example only with reference to the following Examples and the accompanying drawings. In the following examples conventionally produced ground calcium carbonates are included for purposes of comparison with the ground calcium carbonate embodying the invention.

EXAMPLES

Example 1

Calcium carbonate was produced by a conventional method used to produce treated carbonate containing a level of interfering particles of 0.527% by weight as measured by the test described in Example 4, below. Material that was processed according to the present invention was also tested and contained a level of interfering particles of 0.0060% by weight. By comparison, the particulate product according to the present invention showed a 100 fold improvement over the treated calcium carbonate prepared in accordance with conventional methods. When these products were compounded then extruded into film the film containing the treated calcium carbonate produced using conventional methods had 13 interfering particles while the film produced with the particulate product according to the present invention had only 6 interfering particles, as measured in accordance with the test described in Example 5, below.

Example 2

Calcium carbonate, at a coating level of 1.2% by weight stearic acid, was subjected to the ACM type mill and film was produced containing either the carbonate before or after the mill. The number of interfering particles in the film produced with the carbonate before milling was 14, while the number of interfering particles in the film produced with the carbonate after milling was only 7.

Example 3

Coated particles were produced in accordance with claim 2 at a coating level of 1.1% by weight with stearic acid. Using an ACM mill, it was demonstrated that the ACM mill operating conditions could decrease the level of interfering particles. Starting with a level of interfering particles of 0.527% by weight the mill was able to reduce the level of interfering particles to 0.01377% by weight and 0.00088% by weight by running the mill at 1000 rpm and 1800 rpm, respectively. Films formed using the various coated particulates showed an interfering particle count in the film of 13, 6 and 8, respectively.

Example 4

The formulations according to Examples 1–3 were compounded with DOWLEX 2247A, octene LLDPE resin and loaded at 50% by weight. These formulations were subjected to the following test that correlates with the expected performance of these materials during production of breathable films.

The test was carried out to determine interfering particles in coated calcium carbonate. 140 mL of water and 140 mL of isopropanol was placed into the stainless steel mixing cup. 45 grams of coated calcium carbonate was weighed out. A cup was placed on Hamilton Beach mixer at medium setting and rheostat on 120 V was placed within the cup. The speed was set at 35. The carbonate was added to the cup. The speed of the rheostat was increased to 55 and the sample was mixed for 10 minutes. The slurry was poured through a 325 mesh sieve and the sieve was washed with pressure spray set on 32 psi until water passing the sieve was clear. The residue from the sieve was transferred to a previously weighed aluminum pan using a wash bottle. As much water as possible was decanted from the slurry. The residue was dried under a drying lamp. The residue was then weighed and the % agglomeration was calculated.

The calculation was carried out as follows:

$$\% \text{ retained} = \frac{(\text{Wt. of dish and retain} - \text{wt. of dish})}{\text{Sample Wt.}} \times 100$$

EXAMPLE:

Sample wt. =45.0 g

Weight of dish =1.457 g

Weight of dish and retain =1.907 g $$\frac{(1.907-1.457)}{45.0} \times 100 = 0.01\% \text{ retained}$$

Example 5

Test Method for Determining the Agglomeration Level in a 50% by weight loaded film. Calcium carbonate was compounded at 50% by weight in Dowlex 2247A. The compound was then cast into a film at the 50% by weight loading level. A section of the film was cut from the roll and three 9 cm×5 cm rectangles sketched onto the film. The film was placed on a light box and any interfering particles that showed up on the film, i.e., that were raised from the surface of the film, were circled and counted.

The final number of interfering particles is the average of the counts from the three sections and is reported in the table below.

Example 6

A film was produced as described in Example 5. Mineral and application testing was performed on all samples.

Mineral analysis showed that there was no difference between any of the samples in terms of particle size distribution. The OIT was improved at the high coating level after the material was milled. The counts of interfering particles was lower for the low coating level product than the high coating level product. At the attempted coating level, the count of interfering particles was lower for material that had passed though the mill in addition to the surface treatment.

Calcium carbonate samples were received after trialing and tested for microtrac. The coating efficiency was measured with a Perkin Elmer TGA7. The moisture pick up of the samples was measured by placing dried samples into a 50% relative humidity jar for 24 hours and then measuring the weight loss via a Computrac moisture meter. The materials were then compounded at 50% by weight in an octene LLDPE and OIT measured with a Perkin Elmer DSC7. Finally, film was produced. The film was measured for interfering particle count by a visual count on a light box.

Sample ID

| Sample ID | Design |
|---|---|
| 1 | Coating vessel w/indirect heat, coated at 1.1% |
| 2 | Coating vessel w/indirect heat, coated at 1.1% then post treatment run through the ACM |

Mineral Properties

| | Moisture Pick Up 24 hours at 50% RH (%) | Microtrac Median (microns) | Microtrac Topcut (microns) | % Unreacted | Total Coating (%) |
|---|---|---|---|---|---|
| 1 | 0.10% | 1.69 | 7.78 | 0.23 | 1.18 |
| 2 | 0.06% | 1.77 | 7.78 | 0.22 | 1.19 |

Compounded Properties

| Sample ID | Interfering Particle Count (particles/45 cm$^2$) | OIT (min) |
|---|---|---|
| 1 | 14 | 5.9 min |
| 2 | 7 | 9.1 min |

All product properties have been measured and are reported for unstretched films.

Example 7

For film samples, like those of Examples 5 and 6, physical properties and characteristics may be measured as described below. The tensile of the samples can be measured using ASTM 882 and the drop dart can be measured by ASTM 1709. The drop dart of a product according to the present invention would be, for example, 660, however products within the scope of the present invention would have a drop dart value of 500 or above. The tensile strength of a product according to the present invention would be, for example, 16.8, however products within the scope of the present invention would be those having a tensile strength of 15.5 or greater. The percent elongation at break for a film product according to the present invention would be, for example, 917, however products having a percent elongation to break of 850 or greater would be within the scope of the present invention. Preferred products would have a % elongation to break of 900 or better. Finally, the pressure rise is preferably less than about 300 psi and more preferably less than about 200 psi.

We claim:

1. A breathable film product comprising:
    a composition comprising inorganic particulate material with a hydrophobic coating contained thereon, said hydrophobic coating formed from a hydrophobizing surface treatment agent comprising one or more aliphatic carboxylic acids having at least 10 chain carbon atoms,
    wherein said composition contains less than or equal to about 0.285% by weight of agglomerates having a diameter less than about 200 μm but greater than the thickness of the breathable film.

2. The breathable film product of claim 1, wherein said agglomerates have a diameter ranging from about 5 μm to less than about 200 μm.

3. The breathable film product of claim 1, wherein said agglomerates have a diameter ranging from about 25 μm to less than about 200 μm.

4. The breathable film product of claim 1, wherein said breathable film has a thickness ranging from about 5 μm to about 100 μm.

5. The breathable film product of claim 4, wherein said breathable film has a thickness ranging from about 10 μm to about 70 μm.

6. The breathable film product of claim 1, wherein said agglomerate level is less than or equal to about 0.285% by weight of agglomerates with a diameter of about 44 μm or greater.

7. The breathable film product of claim 6, wherein said agglomerate level is less than or equal to about 0.15% by weight of agglomerates with a diameter of about 44 μm or greater.

8. The breathable film product of claim 7, wherein said agglomerate level is less than or equal to about 0.08% by weight for agglomerates with a diameter about 44 μm or greater.

9. The breathable film product of claim 1, wherein the inorganic particulate material comprises a carbonate compound.

10. The breathable film product of claim 1, wherein the inorganic particulate material is chosen from magnesium carbonate, calcium magnesium carbonate, and barium carbonate.

11. The breathable film product of claim 1, wherein the inorganic particulate material comprises calcium carbonate.

12. The breathable film product of claim 1, further comprising at least one mineral additive chosen from kaolin, wollastonite, bauxite, talc, and mica.

13. The breathable film product of claim 1, wherein said inorganic particulate material has a median particle size ranging from about 0.8 to about 1.5 μm.

14. The breathable film product of claim 1, wherein said inorganic particulate material has a median particle size less than or equal to about 1.5 μm.

15. The breathable film product of claim 1, wherein said inorganic particulate material has a median particle size less than or equal to about 1.0 μm.

16. The breathable film product of claim 1, wherein said inorganic particulate material has a mean particle size ranging from about 0.5 μm to about 10 μm.

17. The breathable film product of claim 16, wherein said inorganic particulate material has a mean particle size ranging from about 0.5 μm to about 5 μm.

18. The breathable film product of claim 17, wherein said inorganic particulate material has a mean particle size ranging from about 0.8 μm to about 3 μm.

19. The breathable film product of claim 1, wherein said inorganic particulate material has a particle size ranging from a mean size of about 0.5 μm to a median size of about 1.5 μm.

20. The breathable film product of claim 1, wherein said inorganic particulate material has a particle size ranging from a median size of about 1.5 μm to a mean size of about 3 μm.

21. The breathable film product of claim 1, wherein said inorganic particulate material has a particle size steepness factor of less than about 2.2.

22. The breathable film product of claim 21, wherein said inorganic particulate material has a particle size steepness factor ranging from about 1.1 to about 2.2.

23. The breathable film product of claim 1, wherein said inorganic particulate material has a top cut of not greater than about 12 μm.

24. The breathable film product of claim 23, wherein said inorganic particulate material has a top cut of not greater than about 10 μm.

25. The breathable film product of claim 24, wherein said inorganic particulate material has a top cut of not greater than about 8 μm.

26. The breathable film product of claim 1, wherein said inorganic particulate material has a specific surface area ranging from about 3 $m^2.g^{-1}$ to about 6 $^2.g^{-1}$ as measured by the BET nitrogen absorption method.

27. The breathable film product of claim 1, wherein said composition has a moisture pick up of less than about 0.35% by weight.

28. The breathable film product of claim 27, wherein said composition has a moisture pick up of less than about 0.2% by weight.

29. The breathable film product of claim 28, wherein said composition has a moisture pick up of less than about 0.1% by weight.

30. The breathable film product of claim 1, wherein said composition has a loss on ignition value of less than about 1.3%.

31. The breathable film product of claim 1, wherein said composition has a total surface moisture content of less than about 0.1% by weight after exposure for 40 hours at 20° C. to a moist atmosphere having a relative humidity of 80%.

32. The breathable film product of claim 1, wherein said composition has a total surface moisture content of less than about 0.1% by weight after exposure for 40 hours at 20° C. to a moist atmosphere having a relative humidity of 97%.

33. The breathable film product of claim 1, wherein the breathable film product is included in a packaging material, an article of clothing, a bandage, a bedding product, a surgical garment, or hospital garment.

34. The breathable film product of claim 1, wherein the breathable film product is included in a disposable diaper.

35. The breathable film product of claim 1, wherein the breathable film product is included in a sanitary napkin.

36. The breathable film product of claim 1, wherein the breathable film product is included in a building material.

37. The breathable film product of claim 1, wherein said hydrophobic coating comprises one or more fatty acids chosen from palmitic acid, arachidic acid, montanic acid, capric acid, lauric acid, myristic acid, isostearic acid, and cerotic acid.

38. The breathable film product of claim 1, wherein the hydrophobic coating comprises stearic acid.

39. The breathable film product of claim 38, wherein said stearic acid is in liquid form.

40. The breathable film product of claim 1, wherein said hydrophobic coating comprises behenic acid.

41. The breathable film product of claim 1, further comprising a thermoplastic polymer.

42. The breathable film product of claim 1, wherein the film product has a microstructure comprising interconnected pores of less than about 30 μm.

* * * * *